May 4, 1926.
H. J. MORRISON ET AL
1,583,484
PROCESS OF FORMING FLAKES OF HEATED PLASTICS AND GELATINOUS MATERIALS
Filed May 9, 1925
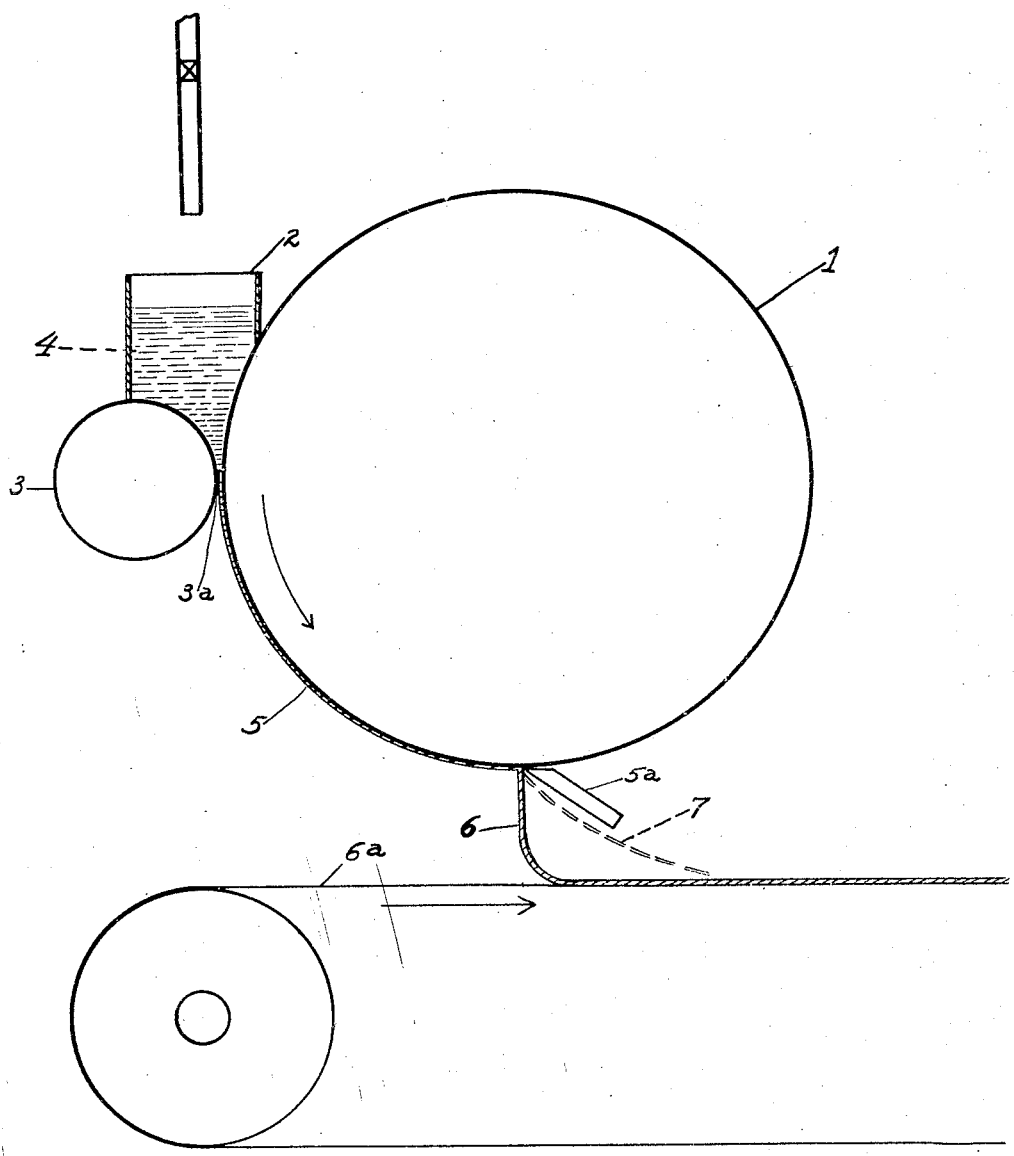
INVENTORS
Harley J. Morrison
James E. Egan
Sumner M. Manley
BY
Allen & Allen
ATTORNEYS Patented May 4, 1926.

1,583,484

UNITED STATES PATENT OFFICE.

HARLEY J. MORRISON, OF CINCINNATI, JAMES E. EGAN, OF WYOMING, AND SUMNER M. MANLEY, OF GLENDALE, OHIO.

PROCESS OF FORMING FLAKES OF HEATED PLASTICS AND GELATINOUS MATERIALS.

Application filed May 9, 1925. Serial No. 29,267.

*To all whom it may concern:*

Be it known that we, HARLEY J. MORRISON, of Cincinnati, JAMES E. EGAN, of Wyoming, and SUMNER M. MANLEY, of Glendale, all citizens of the United States, residing in the county of Hamilton and State of Ohio, have invented new and useful Improvements in Processes of Forming Flakes of Heated Plastics and Gelatinous Materials, of which the following is a full, clear, and exact description, reference being had to the accompanying drawings, forming part of this specification.

Our invention relates to processes of forming flakes from various plastics, and gelatinous materials and particularly to such of the plastics, and gelatinous materials as congeal and set upon cooling.

It is the object of our invention, as will be hereinafter pointed out and claimed, to form from such materials as set upon cooling, ribbons of uniform thinness which will, in the steps of the process incident to the packaging, be broken up into flakes. It is further our object to overcome the variation in thinness of flakes which has characterized the products of prior methods of manufacture.

It will be readily understood that such products which are soluble in water will have a solubility directly proportionate to the surface exposure, so that it is a further object of our invention to provide for the manufacture of much more soluble materials in flake form.

Some of the materials which are now manufactured in flake form are not readily soluble and have a displeasing appearance due to irregularity in thickness and general form. Our process further offers a novel method of forming readily soluble products which should appeal to manufacturers who are not, at present, forming the materials which they manufacture into flake form.

In the prior art it is old to dispose a heated liquid of semi-plastic material on a cooling roll and to regulate the thickness of the coating of material from a hopper onto a roll by a knife or gate, usually forming one side of the hopper. It is also old to transpose the coating from the roll on which the trough or hopper is mounted onto other rolls. These other rolls have usually been a series of three or more, variously heated or cooled, and the gelatinous or plastic coating has been chilled and semi-solidified in stages as it has been transferred from one roll to another. A serrate or straight bladed knife, disposed on the last roll of the series, has also been used to strip the coating from the roll in ribbons of any desired width, or as a continuous sheet having a width of the chilling roll. The product of manufacture on such equipment has been characterized by uneven thickness and a rough uneven structure, due to the breaking up of the plastic or gelled material in transposing it from one roll to another, and also due to the uneven feeding of the material under the adjustment gate on the hopper on the first roll.

For a number of years we have attempted to discharge these plastic materials onto a large roll such as is familiar in the art for the use and manufacture of lard and lard compound, and to make a satisfactory flake on such equipment.

Rolls used in the chilling of lard and lard compound are not equipped with a regulating gate or other device, the film being picked up by a rotating roll and the thickness being regulated by the speed of the roll. This kind of roll is satisfactory where the material being handled is in a liquid and quite fluid condition. The film, however, even in the case of very fluid material being used, cannot be made with the thinness desired in many other products.

We have found that, if these plastics or gels are properly fed onto a single large roll and properly cooled and congealed to a point where the film can be stripped off in a continuous manner, it has a smoother, brighter, and less opaque texture in the finished product. We have found that the film on the roll must be adjusted with extreme care and evenness. For those materials which tend to congeal in the feed hopper, the use of a gate or knife regulator does not provide this necessary nicety of regulation, and the aperture under the knife is easily clogged by some of the partially congealed material.

We have further been able to secure a much nicer adjustment of a film on a cooling roll by regulating the thickness of the film by an aperture between the congealing roll and a feed roll adjustably mounted with relation to the congealing roll, than has heretofore been possible wtih a knife or gate on a hopper regulating the thickness of the film on a roll.

Referring to the drawing:

The figure represents diagrammatically a section of a suitable arrangement of rolls for carrying out our process. In the diagram the large congealing roll is shown at 1. A hopper 2 may be conveniently disposed in the position shown with the adjustable feed roll 3 mounted so as to form an aperture 3ª extending across the congealing roll between the two rolls. The bottom of the hopper is open and the sides closed to retain the gel within the hopper and to keep an ample supply for the congealing roll to withdraw continuously. In the figure the gel within the hopper is indicated at 4 and the film on the congealing roll at 5. A stripping knife 5ª is disposed in position to strip the film from the roll and the congealed film 6 drops down to the belt conveyor 6ª which conveys the sheet or the ribbons thus formed to the following steps in the process of manufacture incident to the packaging of the flakes.

The rolls may conveniently be hollow so that suitable means may be employed for heating the feed roll if desired or cooling the congealing roll if the gels do not set naturally. The usual direction of the rotation of the rolls is in an opposite direction and this brings the two surfaces of the rolls toward one another at the admission aperture. It is furthermore usual to dispose the hopper as shown although we have been able to secure good results on certain kinds of gels by merely feeding the gel or plastic between the two rolls where it forms into a semi-aerated roll of material which is gradually drawn in between the two rolls by the congealing roll. This latter method is particularly effective when the rolls are rotated in the same directions and the feed roll tends to carry the material away from the aperture and the congealing roll to carry the material through the aperture.

The congealing roll and the feed roll may be rotated at speeds which, for each material handled, are the most suitable. It is further of advantage, in preventing the tendency of the sides of the ribbons from curling in, to stretch the ribbons as they feed from the stripping knife onto the conveyor. This may be accomplished by several methods, one of the most effective of which seems to be to so regulate the speed of the conveyor that it has a faster lineal speed than the peripheral speed of the congealing roll so that the ribbons dropping against the conveyor tend to adhere to it. By thus operating the conveyor at a faster lineal speed than the peripheral speed of the congealing roll the ribbons are stretched out as indicated at 7. This operation also tends to diminish the thickness of the ribbons so that it has a two-fold advantage.

The temperature control at which various gels and plastics will congeal will of course vary with the particular material used so that we do not wish to confine ourselves to limited ranges of temperature for any specific material. The hollow feature of the rolls will, of course, enable any desired degree of temperature to be induced in the congealing or feeding roll by the admission of heating or cooling mediums.

A specific use for our process is in the preparation of edible gelatine flakes, where it is desirable to have a product which is clear, smooth and uncurled, and otherwise pleasing in appearance and where its thickness is so uniformly regulated and thin that is dissolves quickly and readily. All of these features add materially to its convenience in use and to the economy of time in preparing it in solution ready for use.

In the foregoing specification the term "gels" and "plastics" are used synonymously. In some schools of chemistry the terms are considered synonymous and in others a sharp distinction is drawn. In the claims that follow, while we have limited ourselves to the term "gel" it should be understood that in using the term, we wish to be understood as referring to both plastics and gels as understood by the first mentioned school.

Having thus described our invention, what we claim as new and desire to secure by Letters Patent, is:

1. The process of forming flakes of semi-solid gels which harden upon cooling comprising the disposing of such gels at an aperture between a hot rotating roll and a cold rotating roll, solidifying a film introduced at such an aperture on the cold roll during a portion of the cycle of revolution of the cold roll, and stripping the solidified film from the roll.

2. The process of forming flakes of semi-solid gels which harden upon cooling comprising the disposing of such gels at an aperture between a heated rotating hollow roll, and a cooled hollow rotating roll, congealing a film of the gel introduced at such an aperture on the last named roll during a portion of the cycle of revolution of the roll, and stripping the congealed film from the roll.

3. The process of forming flakes of semi-solid gels which harden upon cooling comprising the disposing of such materials at an aperture between a hot rotating roll and a cold rotating roll, solidifying a film introduced at such an aperture on the cold roll during a portion of the cycle of revolution of the cold roll, scraping the solidified film from the roll in the form of ribbons and mechanically stretching the ribbons.

4. The process of forming flakes comprising the feeding of a semi-solid film of gel which hardens upon cooling, by a hot and a cold rotating roll having a longitudinal aperture between them, and cooling said cold roll so that the film will adhere thereto and cooling the film on the cold roll during a portion of the cycle of revolution of the cold roll and scraping the film from the roll.

5. The process of forming flakes comprising the introduction of a hot gel through a longitudinal opening between a cooled rotating cylindrical element, and a hot rotating cylindrical element, cooling the cooled element so as to cause the gel to adhere thereto in a film and stripping the cooled film from the cooled element in the form of ribbons.

6. The process of forming flakes comprising the introduction of a hot gel through a longitudinal opening between a cooled rotating cylindrical element, and a hot rotating cylindrical element, cooling the cooled element so as to cause the gels to adhere thereto in a film and stripping the cooled film from the cooled element in the form of ribbons and mechanically attenuating the ribbons to reduce their thickness.

HARLEY J. MORRISON.
JAMES E. EGAN.
SUMNER M. MANLEY.